May 3, 1927.

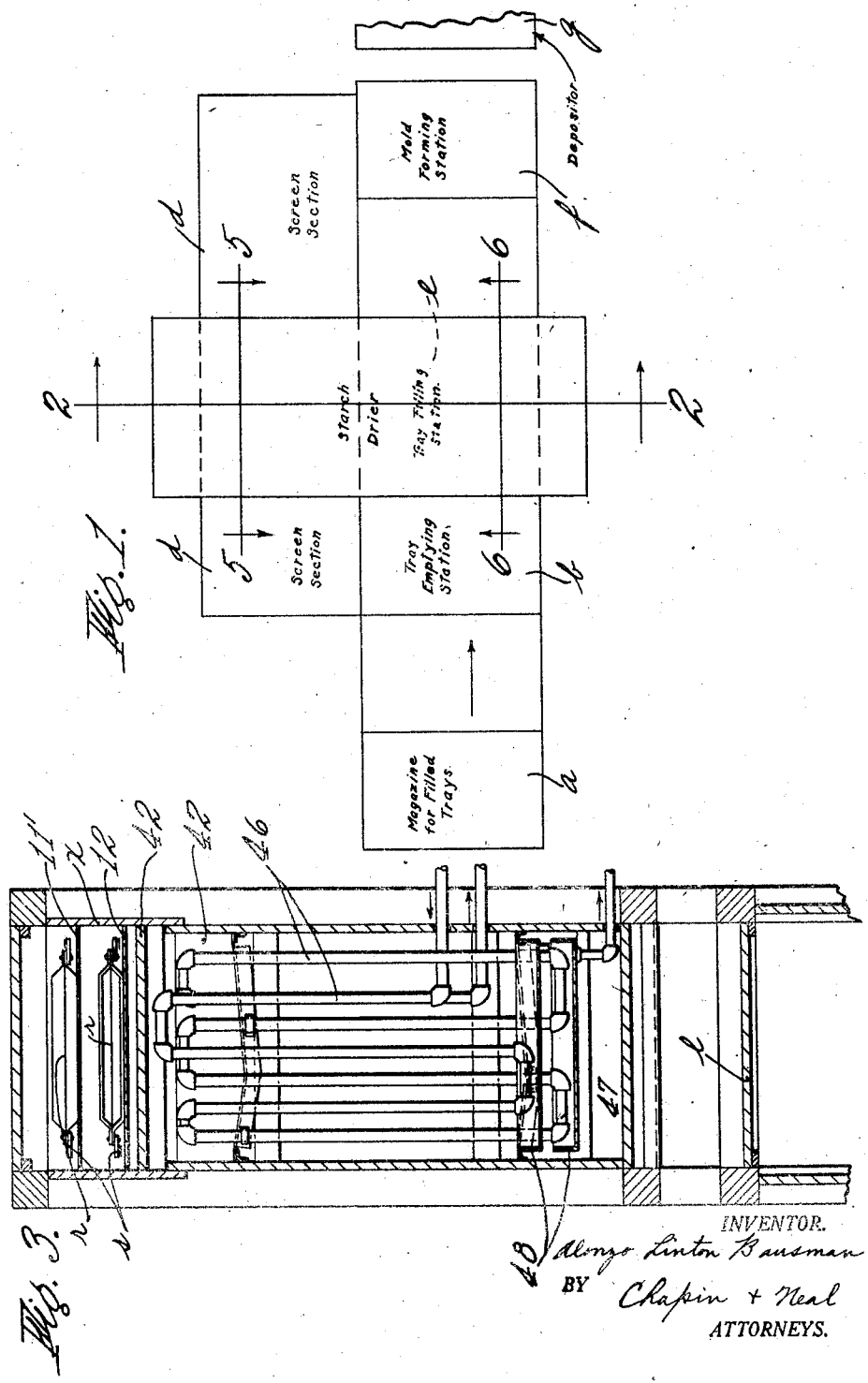

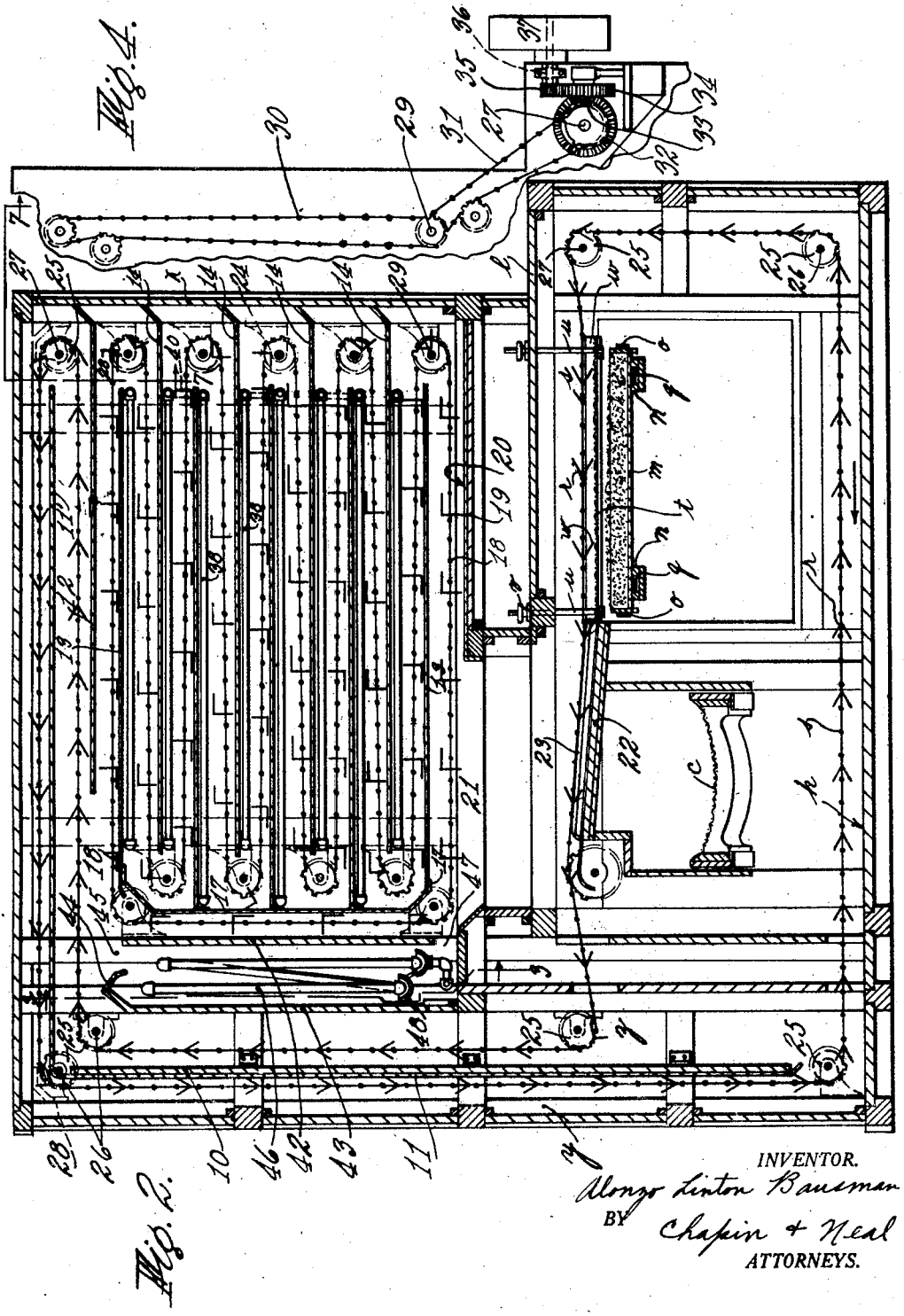

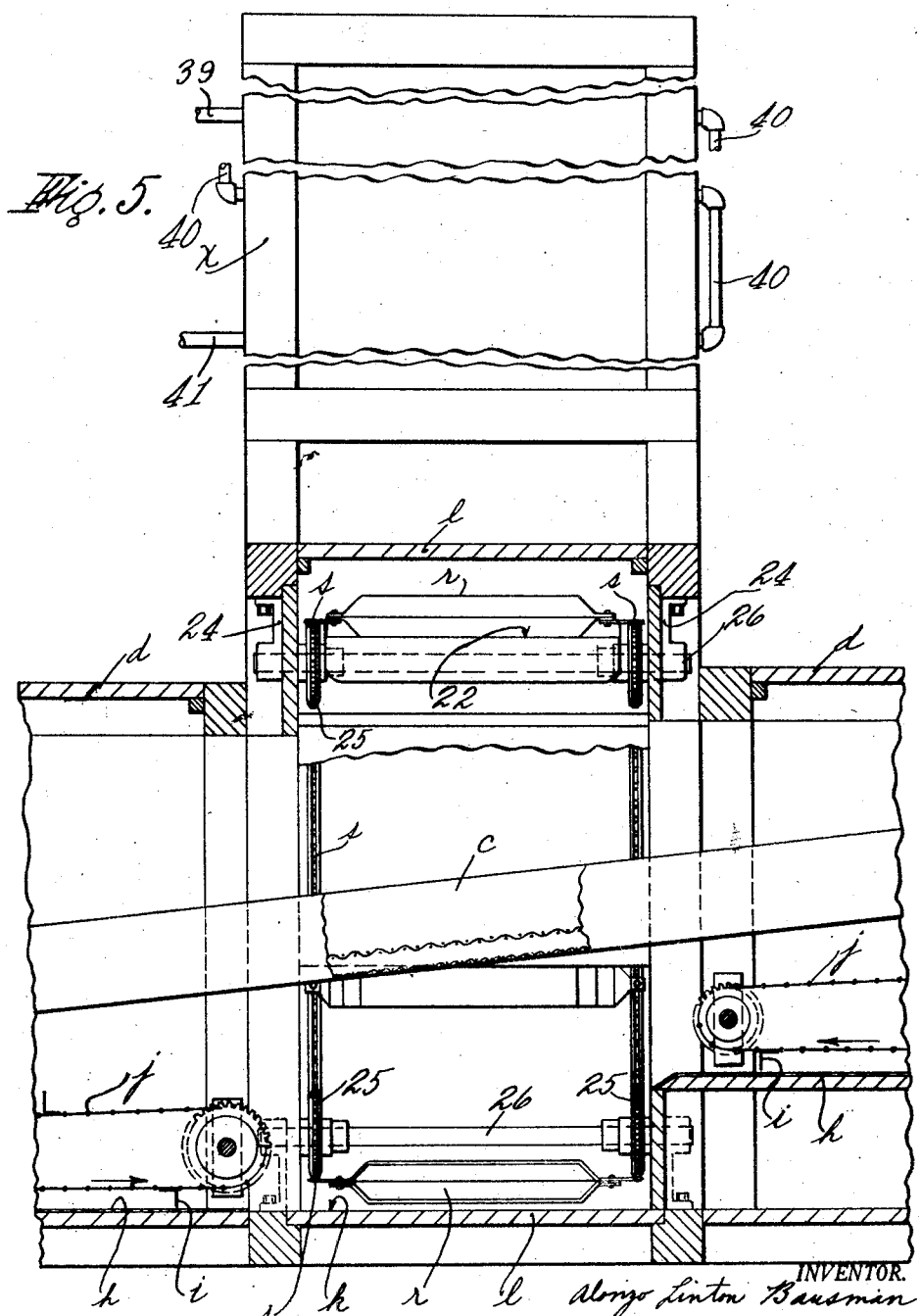

A. L. BAUSMAN 1,627,138

STARCH MOLDING APPARATUS

Filed June 11, 1925    4 Sheets-Sheet 4

INVENTOR.
Alonzo Linton Bausman
BY Chapin & Neal
ATTORNEYS.

Patented May 3, 1927.

1,627,138

UNITED STATES PATENT OFFICE.

ALONZO LINTON BAUSMAN, OF SPRINGFIELD, MASSACHUSETTS, ASSIGNOR TO NATIONAL EQUIPMENT COMPANY, OF SPRINGFIELD, MASSACHUSETTS, A CORPORATION OF MASSACHUSETTS.

STARCH-MOLDING APPARATUS.

Application filed June 11, 1925. Serial No. 36,395.

This invention relates to improvements in that class of confectionery machinery known generally as starch molding apparatus, in which candies are cast in molds formed in starch contained in a tray.

Machines of this class are usually adapted to take a tray containing the molded candies, after the same have hardened, and empty the tray,—delivering the contents to mechanism whereby the candies and starch are separated,—and to convey the empty tray successively to a starch filling station, a mold forming station and a candy filling station. They also include means for conveying the starch from the separating mechanism and delivering it into the empty trays as they successively arrive at the starch filling station. This is the best form of starch molding apparatus, as it covers the complete combination, but there are other forms of starch molding apparatus, semiautomatic in operation or providing for part only of the sequence of operations described, with which this invention may equally well be embodied for it is primarily concerned with the conditioning of the starch used for filling the trays.

In these machines, the same starch is used over and over again until it is no longer suitable. One factor, which eventually renders the starch unsuitable, is moisture. The starch absorbs moisture from the air as well as from the candies cast therein and becomes wet, forming into lumps, which cannot pass through the screen at the tray filling station and will eventually clog the latter unless removed. Moreover, the wet and heavy starch is much harder to move than when the same is in a light and dry condition, wherefore a heavy drag is created on the starch conveyors and elevators, not only requiring more power but frequently, due to lumps, causing stalling or even breaking of the parts. It has been the practice to provide safety devices in the driving connections for the starch conveyors which will disconnect the drive when the load becomes so heavy as to cause damage. Aside from these disadvantages due to moisture-laden starch, it is imperative for certain classes of candy to have the starch not only dry but warm and it is desirable for all classes of candy. In marshmallow work, it is essential to quickly form a so-called skin, or dry and relatively hard outer surface which not only prevents the starch from absorbing further moisture from the marshmallow but confines the soft, sticky substance so that it can be subsequently handled.

For marshmallow work, it has heretofore been proposed to heat the "printer" which forms the mold depressions in the starch prior to the casting operation. This scheme, at best, provides only for localized heating of the starch and is not effective to dry all of the starch nor to prevent the difficulties above set forth in connection with the starch conveying, elevating and filling apparatus. Neither is it really adequately effective for marshmallow work for the printer is depressed into the starch only for a few seconds and there is not time for an adequate heating of the mold walls, much less for a drying of the large body of starch contained in the tray. Only the mold walls are heated and these only to a low degree, as a consequence of which the molds are liable to become entirely cold by the time they reach the depositor or mold filling station.

This invention has for its object to provide means operating in conjunction with starch molding apparatus to keep the starch in a light and dry condition, whereby the above described difficulties with conveying it are avoided as well as those due to the formation of lumps in the starch and, by avoiding the formation of lumps, the same body of starch may be used over and over again for a much longer time than has heretofore been possible.

The invention also has for an object the provision of means operating in conjunction with starch molding apparatus to not only keep the starch dry but to heat all of the starch prior to its delivery to the tray, whereby the tray is filled with a large body of starch heated to an adequate degree and capable of retaining its heat for a considerable length of time and at least until the candies have been cast in the molds therein.

There are many details contributing to the attainment of these broad objects and these and other objects and advantages will appear in the following description and in the illustrative embodiment of the invention in the accompanying drawings, in which:

Fig. 1 is a diagrammatical plan view showing the relative location of the various sections of a common type of tray emptying and filling machine and showing also the location of the starch conditioning apparatus;

Fig. 2 is a cross sectional view taken on the line 2—2 of Fig. 1;

Fig. 3 is a sectional elevational view of the air conditioning apparatus taken on the line 3—3 of Fig. 2;

Fig. 4 is a fragmentary elevational view of the exterior of one corner of the casing shown in Fig. 2, showing the driving connections;

Figs. 5 and 6 are sectional elevational views taken on the lines 5—5 and 6—6 of Fig. 1; and Fig. 7 is a fragmentary sectional elevational view taken on the line 7—7 of Fig. 2.

While the invention may be embodied in various kinds of starch molding machines, as above set forth, it will be illustrated and described herein as embodied in a machine of the general type disclosed in United States Letters Patent No. 648,353, granted April 24, 1900, on an invention of Gabriel Carlson. Machines of this type include a magazine, located at $a$ (Fig. 1), to hold a vertical stack of trays, each containing a plurality of candies, which have previously been cast in molds formed in a body of starch and which have hardened. These trays are automatically taken from the magazine one by one and conveyed to a tray emptying station, located at $b$, where the contents of the tray are emptied into a reciprocating sieve $c$ housed in a casing $d$. The empty trays are then automatically carried to a tray filling station, located at $e$, where they are filled with starch and thence travel step by step to a mold forming station, located at $f$ and finally to a candy casting station located at $g$, where the molds formed at station $f$ are filled with confectionery material by a so-called depositor.

In the screen section casing $d$, the sieve $c$ functions to separate the candies and starch and the latter falls through the sieve upon the floor $h$ of the casing $d$ (Fig. 5). Scrapers $i$ (Fig. 5) carried by and between pairs of conveyor chains $j$ serve to carry the starch, deposited on floor $h$, to a central point, which is the floor $k$ of the casing $l$ enclosing the tray filling section of the machine. The casing $l$ is wide enough to encompass both the sieve $d$ and the conveying means for the empty trays, as shown in Fig. 2. The trays $m$ slide along laterally spaced and longitudinally extending runways $n$ riding between side guides $o$ and being moved by lugs $p$ fixed at suitable intervals to conveyor chains $q$. The starch, falling through sieve $c$, is picked up by buckets $r$, carried by and between conveyor chains $s$, and carried over a screen $t$ through which it falls into the empty tray therebelow. The screen $t$ is supported by four rods $u$ depending from the upper wall of casing $l$ and held thereto by nuts $v$ by means of which the level of screen $t$ may be adjusted. The buckets $r$ ride over screen $t$ and aid in forcing the starch therethrough,—the bucket chains $s$ riding along runways $w$ carried by the screen.

For a more complete disclosure of the details of construction and operation of the machine reference is made to the Carlson patent, above identified.

In the machine of the Carlson patent the starch falling through sieve $c$ is carried directly to and deposited in the trays, with the disadvantages above set forth. In the present machine, as shown in Fig. 2, the buckets $r$ carry the starch to a drying or heating apparatus located in a casing $x$ and after the starch has been dried, or heated to the desired degree, it is deposited in the path of return travel of buckets $r$ and the latter carry the conditioned starch over screen $t$ to fill the trays in the customary manner.

The casing $x$ is superimposed on the casing $l$ and extends beyond one end of casing $a$ and downwardly to the floor line to provide vertical channels $y$ and $z$ in which the buckets $r$ travel upwardly and downwardly, respectively. A partition 10 separates the channels $y$ and $z$ and provides a guiding surface for the buckets in their upward travel. A wearing plate 11 of sheet metal covers partition 10 and at its upper end is bent at right angles to form a horizontal partition 11' which extends nearly to the opposite end of casing $x$. The starch carried upwardly by buckets $r$ is dragged along partition 11' until it reaches the remote end thereof, where it falls upon a similar underlying partition 12 which extends from the last named end of casing $x$ part way along the casing. The starch is carried along partition 12 by the buckets $r$ until it falls upon the uppermost partition 13 of the drying or heating apparatus.

The drying apparatus consists of a series of vertically spaced and horizontally disposed partitions 13 and 14 which extend entirely across casing $x$, as do the described partitions 11 and 12, as shown in Fig. 6. These partitions are suitably supported from pairs of plates 15 which form inner vertical side walls for the central portion of casing $x$, which walls are spaced from the outer walls leaving air spaces 16 for the purpose of insulation. The partitions 13 and 14 are disposed in alternation. The partitions 13 are all secured at one end to a vertical partition 17 and extend toward but terminate in spaced relation with one end wall of casing *x*. The partitions 14 abut the last named wall and extend toward but terminate in spaced relation with the partition 17. A conveyor, including a pair of laterally spaced chains 18 interconnected at suitable intervals by a plurality of angle iron scrapers 19, is mounted to travel horizontally back and forth over the several partitions 13 and 14, weaving in and out between the same and returning in a horizontal path below the lower partition 13 and thence upwardly in a vertical path outside partition 17. The conveyor is so arranged that its scrapers 19 carry the starch, delivered on upper partition 13, to the right (Fig. 2) along the latter, thence to the left along the partition 14 therebelow, thence to the right along the partition 13 therebelow, and so forth until the starch finally falls upon the floor 20 of casing *x*. The scrapers 19, in their return travel move the starch over floor 20 and cause it to drop through an opening 21 into the left hand upper end of casing *l*. The starch, falling through opening 21, is deposited on a partition 22 which overlies sieve *c* and is inclined downwardly toward screen *t* and terminates closely adjacent the latter. The buckets *r* ride along partition 22 and carry the starch onto screen *t*. Runways 23 are provided on partition 22 which aline with the similar runways *w*, provided on screen *t*, to properly guide the conveyor chains *s*.

The chains *s* are mounted on suitable sprockets 25 to guide them in the path of travel described. These sprockets are arranged in pairs on shafts 26 and 27 which extend across casings *l* and *x* and through the side walls thereof being supported outside the casings by bearings 24. The conveyor chains 18 are mounted similarly on sprockets 28 for travel in the path described and the sprockets 28 are supported in the same manner as sprockets 25. One pair of sprockets 28,—those fixed to shaft 29 are driven as are also the two shafts 27 which carry sprockets 18. For this purpose, the upper shaft 27 is connected outside casing *x* (Fig. 4) by a chain 30 and suitable sprockets to shaft 29 and the latter is driven in a similar manner by a chain 31 from the lower shaft 27. Fixed on the latter is a bevel gear 32, driven from a bevel pinion 33 to which is fixed a spur gear 34, meshing with a pinion 35 on a drive shaft 36. The latter, which is one of the power shafts of the usual tray emptying and filling apparatus, is driven from a suitable source of power by a pulley 37.

The starch is dried, or heated to the desired degree, in the following manner. Underlying each of the partitions 13 and 14 except the lowermost partition 13, is a pipe coil 38 through which a suitable heating medium may be circulated. This medium is admitted through an inlet pipe 39 (Fig. 5) to one end of the upper coil 38 and its other end is connected outside casing *x* by a pipe 40 with the corresponding end of the coil 38 therebelow and the remaining coils are similarly connected,—the connecting pipes 40 being disposed alternately on opposite sides of casing *x* and the lower coil having an outlet pipe 41. Provision is also made for the circulation of air through the drying apparatus, the cooler air entering between the lower pair of partitions 13 and 14 and travelling back and forth between successive pairs of these partitions and finally emerging between the uppermost partition 13 and the overlying partition 12. To the left of partition 17 and spaced therefrom just sufficient to provide the necessary vertical channel for the return travel of the scrapers 19, is a vertical partition 42 and to the left of the latter is a partition 43. A deflector 44 rises from the latter as high as possible and still clear of the buckets *r* extends part way toward partition 42 leaving an inlet 45 for the warmest air, which, coming from the top of the drying apparatus, is laden with moisture. A coil 46 is mounted between partitions 42 and 43 which, by cooling the moisture laden air, causes the moisture to be condensed and the air dried in a well known manner. The air, thus conditioned, being cooler falls to the lower part of the compartment, within which coils 46 are housed, passes through an outlet 47 and returns to the drying apparatus.

A thermo-siphonic circulation of air is thus induced which carries off the moisture liberated from the starch under the action of heat from coils 38 and thereby facilitates and expedites the drying of the starch. The circulation described is also made to cause the air to flow through an air conditioning apparatus to remove moisture therefrom and render it suitable to again be passed through the drying apparatus. The moisture is condensed on the coils 46 in the form of drops of water which flow down the coils, the drip being received in troughs 48 which carry it out of the casing.

In operation, the starch which is separated from the candies by sieve *c* falls on floor *k* and, instead of being carried by the buckets *r* directly to screen *t* for the purpose of filling the trays *m* as they successively are brought therebelow, is carried upwardly by the buckets and delivered to the drying apparatus. The scrapers 19 then take this starch and carry it back and forth over the heated partitions 13 and 14, whereby the moisture is driven off and the starch dried, or heated, if necessary, to any desired degree. The starch, thus conditioned is delivered from the drying apparatus through opening 21 onto partition 22 in position to be picked up by the buckets $r$ in their return travel and carried to screen $t$ for the usual tray filling operation.

The invention has been disclosed herein, in an embodiment at present preferred, for illustrative purposes but the scope of the invention is defined by the appended claims rather than by the foregoing description.

What I claim is:

1. In a machine for filling trays with starch, having a tray filling station and supporting means at such station for an empty tray, means for drying starch, a source of starch supply, and means for conveying the starch from said supply to and through said drying means and thence to the tray at said filling station.

2. In starch molding apparatus, having a tray filling station, means for successively moving trays past said station, means for successively filling said trays with starch, and means for heating the starch just prior to its delivery to a tray at said filling station.

3. In starch molding apparatus, having a tray filling station, means for successively moving trays past said station, starch heating means, and means for moving the starch through said means and subsequently delivering the heated starch into a tray at said filling station.

4. In apparatus of the general class described, having means for separating candies and starch into which means trays filled with candies molded in starch may be emptied and also having supporting means on which an empty tray may be placed in position to be filled with starch, a starch drying means, and means for taking starch delivered from said separating means and carrying it to and through said drying means and delivering it into an empty tray on said supporting means.

5. In apparatus of the general class described, having means for separating candies and starch into which means trays filled with candies molded in starch may be emptied and also having supporting means on which an empty tray may be placed in position to be filled with starch, a starch drying means, and means for taking starch delivered from said separating means and carrying it to and through said drying means and delivering it into an empty tray on said supporting means, and air conditioning apparatus arranged to receive air from said drying means and remove moisture therefrom before it is returned to said drying means.

6. In apparatus of the general class described, having means for separating candies and starch into which means trays filled with candies molded in starch may be emptied and also having supporting means on which an empty tray may be placed in position to be filled with starch, a starch drying means, and means for taking starch delivered from said separating means and carrying it to and through said drying means and delivering it into an empty tray on said supporting means, and means for removing moisture from the air from said drying apparatus.

7. In apparatus of the general class described, having means for separating candies and starch into which means trays filled with candies molded in starch may be emptied and also having supporting means on which an empty tray may be placed in position to be filled with starch, a starch drying means, and means for taking starch delivered from said separating means and carrying it to and through said drying means and delivering it into an empty tray on said supporting means, said drying apparatus comprising a heated surface over which the starch is carried in a thin layer by said conveying means.

8. In a machine of the general class described, means for separating candies and starch, starch heating means, means for moving empty trays into position for filling, conveying means to carry starch delivered from said separating means to said heating means, said conveying means returning in a path overlying the path of travel of said empty trays, and means for moving the starch through said heating means and delivering it to said conveying means at such a point in its return travel that the latter picks up the heated starch and delivers it to the empty trays.

9. In a machine of the general class described, means for separating candies and starch, tray supporting means, means for filling the trays with starch delivered from the separating means, and means acting on the entire body of starch during each cycle of travel through the machine to remove moisture therefrom.

10. In a machine of the general class described, means for separating candies and starch, tray supporting means, means for filling the trays with starch delivered from the separating means, and continuously acting starch conditioning means operated from said machine to heat the starch during its cycle of travel through the machine.

11. In a machine of the general class described, a casing, means therein for separating candies and starch, tray conveying means for moving empty trays through said casing into position for filling and for moving filled trays out of said position, means for drying starch disposed above said separating and tray conveying means, starch conveying means mounted to travel from a position below said separating and tray conveying means upwardly to said drying means to carry starch from the separating means to the drying means, said starch conveying means returning downwardly and thence over and across the tray conveying means at said tray filling position, and a second starch conveying means to take starch elevated by the first starch conveying means and carry it through said drying means and then deliver it into the path of return travel of the first starch conveying means, whereby the dried starch is carried over an empty tray and delivered therein.

In testimony whereof I have affixed my signature.

ALONZO LINTON BAUSMAN.